United States Patent

Lachmayer et al.

[11] Patent Number: 5,899,559
[45] Date of Patent: May 4, 1999

[54] HEADLAMP FOR VEHICLES

[75] Inventors: Roland Lachmayer, Bad Sassendorf; Ewald Topp, Anroechte, both of Germany

[73] Assignee: Hella KG Hueck & Co., Lippstadt, Germany

[21] Appl. No.: 09/031,836

[22] Filed: Feb. 27, 1998

[30] Foreign Application Priority Data

Feb. 28, 1997 [DE] Germany .......................... 197 08 109

[51] Int. Cl.⁶ ................................................. B60Q 1/04
[52] U.S. Cl. ........................................ 362/513; 362/539
[58] Field of Search .................................. 362/512, 513, 362/539, 277, 319

[56] References Cited

U.S. PATENT DOCUMENTS 5,673,990  10/1997  Neumann et al. ..................... 362/513

FOREIGN PATENT DOCUMENTS

| 0 723 108 A1 | 7/1996 | European Pat. Off. . |
| 25 09 318 A1 | 9/1975 | Germany . |
| 38 06 658 A1 | 9/1989 | Germany . |
| 41 02 586 A1 | 8/1991 | Germany . |
| 41 37 332 A1 | 5/1992 | Germany . |

*Primary Examiner*—Stephen Husar
*Attorney, Agent, or Firm*—Griffin, Butler, Whisenhunt & Szipl, LLP

[57] ABSTRACT

A headlamp has a saucer-shaped reflector (1) with two focuses. A light source (2) is positioned at an inner focus. An adjustable screen (4) is located between the reflector and a lens (3), and can be adjusted into positions providing high-beam and low-beam light. A bracket (5) has an area below the adjustable screen that serves as a shielding element for light beams from the light source, and as a holder for a remote-controlled adjusting device (6).

14 Claims, 5 Drawing Sheets

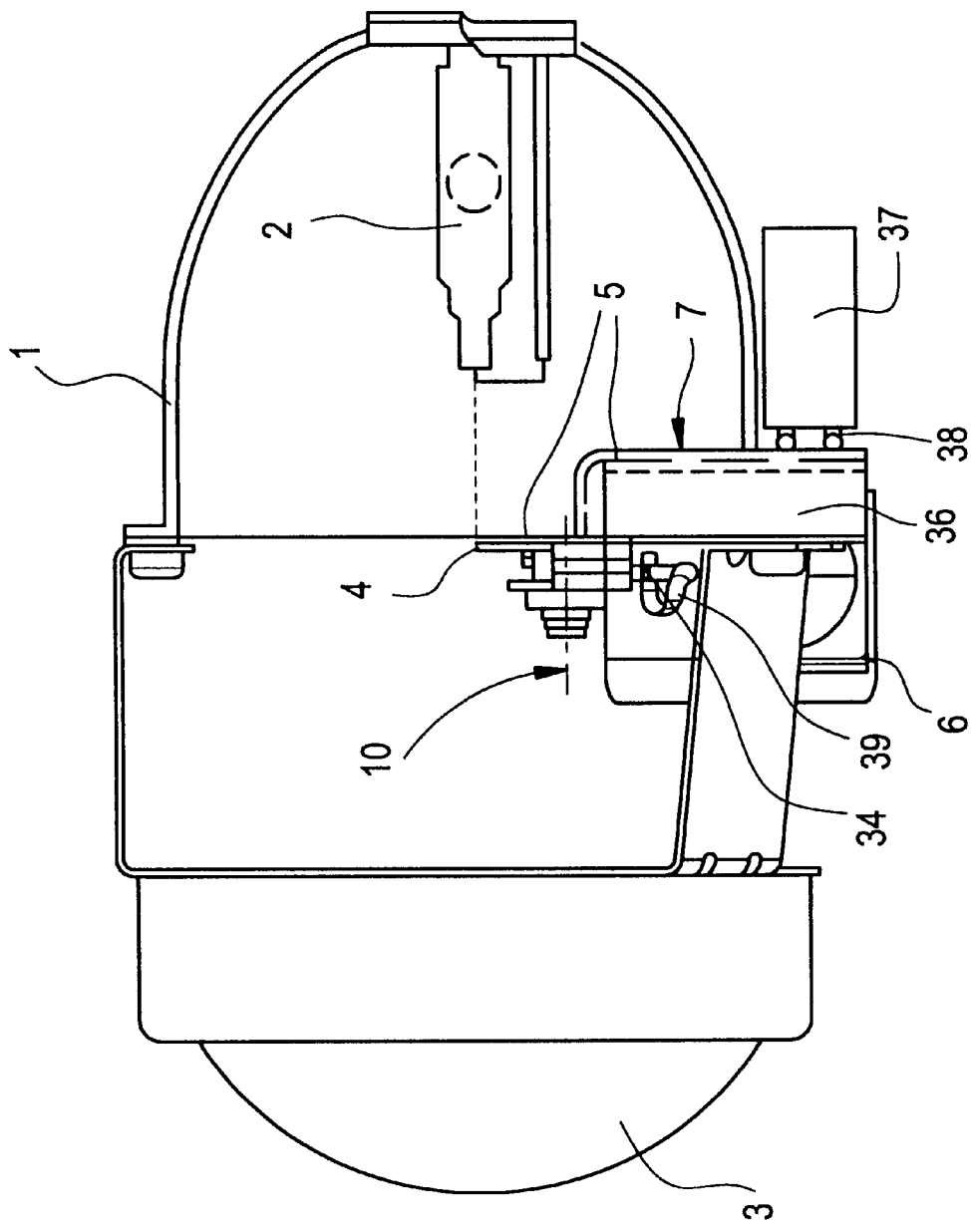

HEADLAMP FOR VEHICLES

BACKGROUND OF THE INVENTION

This invention relates to a headlamp for vehicles, having a saucer-shaped reflector with two focuses, and having a light source located at one focus, with an adjustable screen mounted on a stationary plate-like bracket between a lens and the reflector that can be adjusted by a remote-controlled adjusting device between, at least, positions that provide high-beam and low-beam light.

European patent document (EP 0 723 108 A1) discloses a headlamp for vehicles wherein a gas discharge lamp serves as a light source, an arc of which is positioned at an inner focus of an ellipsoidal reflector. An outer focus of the reflector, and an adjustable screen adjacent to the outer focus, are located between the reflector and a lens. The screen is mounted on a stationary, plate-like bracket, a main length of which extends crosswise with respect to an optical axis, and which is positioned below the optical axis. One or more adjusting devices serve to displace the screen into positions providing low-beam and high-beam light, and to reverse the screen for right-hand and left-hand drive. The adjusting device is positioned outside an optical system comprising the reflector, screen and lens, and a mounting location for the stationary plate-like bracket and for the adjusting device is not apparent from European patent document (EP 0 723 108 A1). The screen can be adjusted in a vertical guide of the bracket into its high-beam and low-beam positions, or it can be pivoted about a horizontal axis extending crosswise with respect to the optical axis. The screen can easily get tilted during vertical displacement in the guide. When the screen is pivoted about the horizontal axis, light beams illuminating an area directly in front of the vehicle can be shielded, and an unwanted dark zone thus occurs temporarily in front of the vehicle. The screen is reversed for right-hand and left-hand drive by being pivoted about an axis extending in a light-exit direction, in a vertical center plane of the reflector. For providing asymmetrical low-beam light, the screen has two screen edge sections at different levels. In the high-beam position, the adjustable screen is placed below an upper edge of the plate-like bracket. The upper edge of the bracket then serves as a screen edge for producing a light/dark limit for high-beam light.

German patent document (DE 38 06 658 A1) discloses a headlamp for vehicles wherein a support frame of a lens attached at a front edge of a reflector serves as a bracket for a screen. The screen can be pivoted into its high-beam and low-beam positions about a horizontal axis extending crosswise to an optical axis. An adjusting device of the screen is located on a back of the reflector and is formed by an electric stroke magnet (solenoid). The stroke magnet is hinged to a downward-pointing swivel arm of the screen via a long stroke rod extending below the reflector. Assembly of the adjusting device is time-consuming and complicated since it must be attached to the back of the reflector, and a free end of the stroke rod must be connected to the swivel arm of the screen; thus the adjusting device and the screen do not form a unit that can be pre-assembled. In addition, a size of a system including the reflector, the screen and the lens is rather large, since the adjusting device and the long stroke rod are positioned outside the system.

German patent document (DE 41 02 586 A1) discloses a headlamp for vehicles having an adjustable screen that creates a light/dark border of asymmetrical low-beam light and is continuously adjustable so that the light/dark border of the low-beam light beam can adapt to inclinations of a vehicle, particularly of a motorcycle. The screen cannot be changed for high-beam and low-beam light. A surface area of the adjustable screen is so large that it shields all stray light beams from the light source below its screen edge. An arm-shaped bracket for the adjustable screen and an electric adjusting device are attached to the reflector. The screen is mounted at an upwardly-facing end of the bracket so that it can pivot about an axis that coincides with an optical axis of the headlamp. The lower end of the bracket extends out of a system defined between the reflector, the screen, and the lens, where it supports the electric adjusting device.

It is an object of this invention to provide a headlamp for vehicles as described in the opening paragraph above, wherein the remote-controlled adjusting device need not result in any increase in structural dimensions of the headlamp, with an additional bracket for the remote-controlled adjusting device being unnecessary, and a shielding of all stray light beams from the light source below an edge of the adjustable screen is made possible.

SUMMARY

According to principles of the invention a remote-controlled adjusting device is located at least partially inside an optical system defined by a reflector, an adjustable screen and a lens, and is attached below the adjustable screen to a portion of a stationary bracket that serves as a shielding element for light beams from a light source. The bracket, the screen and the adjusting device together form an assembly unit, and an area of the bracket below the adjustable screen can be large enough that it shields all stray light beams from the light source.

BRIEF DESCRIPTION OF THE DRAWINGS

The invention is described and explained in more detail below using an embodiment shown in the drawings. The described and drawn features, in other embodiments of the invention, can be used individually or in preferred combinations. The foregoing and other objects, features and advantages of the invention will be apparent from the following more particular description of a preferred embodiment of the invention, as illustrated in the accompanying drawings in which reference characters refer to the same parts throughout the different views. The drawings are not necessarily to scale, emphasis instead being placed upon illustrating principles of the invention in a clear manner.

FIG. 8 is a center vertical cross-sectional view of an additional vehicle headlamp of this invention, wherein a remote-controlled adjusting device for a screen is placed in a recess of a bracket thereof.

DESCRIPTION OF THE PREFERRED EMBODIMENT

Figure 1:
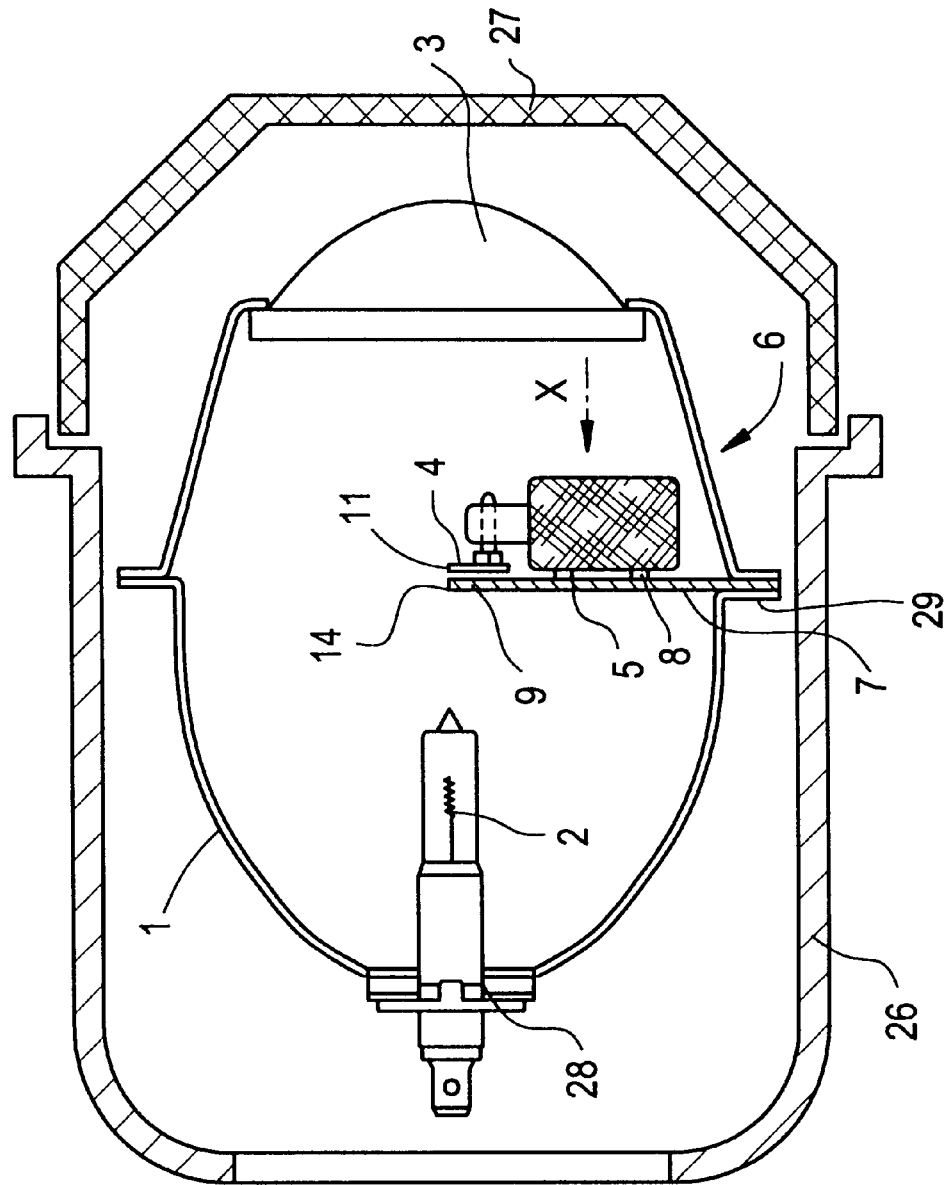
FIG. 1 is a center vertical section of a vehicle headlamp of this invention having a remote-controlled adjusting device for an adjustable screen.

A headlamp for vehicles illustrated in FIG. 1 has a pot-shaped headlamp housing 26 on a front edge of which a saucer-shaped, light-transmissive, front plate 27 is positioned. An optical system comprising an ellipsoidal reflector 1, a light source 2, an adjustable screen 4 and a lens 3 is adjustably arranged within a space inside the headlamp formed by the headlamp housing 26 and the cover front plate 27. The light source 2 is located at an inner focus of the ellipsoidal reflector 1. A coil of an incandescent bulb or an arc of a gas discharge lamp can be used as the light source 2. The lamp, or light source, is set into a reflector opening 28 at an apex of the reflector 1. The adjustable screen 4 is positioned with a screen edge 11 thereof near an outer focus of the ellipsoidal reflector 1. A reflection area of the ellipsoidal reflector 1 can be a freely designed surface, i.e. at least some areas of the reflection surface are not determined by a mathematical function.

The adjustable screen 4 and a remote-controlled adjusting device 6 are attached to a plate-like bracket 5. The plate-like bracket 5 is semicircular and is attached below a horizontal center plane of the reflector 1, at a front edge 29 of the reflector 1. Thus the plate-like bracket 5 extends in a plane through which the optical axis of the reflector 1 passes at a perpendicular angle. The plate-like bracket, on both sides of a vertical center plane of the reflector 1, has mounting elements 30 with which the bracket 5 is attached to the front edge 29 of the reflector 1. The screen 4 is a single-armed lever that can pivot about an axis 10 on the bracket 5 into positions providing low-beam and high-beam light. A length of the screen 4 extends adjacent to an upper edge area 9 of the bracket 5. In the low-beam light position of the screen 4, the screen edge 11 extends above the bracket 5 and, with screen edge sections 12 and 13 being at different levels, provides asymmetrical low-beam light. When the screen 4 is pivoted from the low-beam light position into the high-beam light position, at least a greater part of the screen edge 11 of the screen 4 is below a bracket edge 14 of the bracket 5. The bracket edge 14 of the bracket 5 has two sections 15 extending at inclinations with respect to the vertical center plane of the reflector 1, thus providing symmetrical high-beam light. The axis 10 about which the screen 4 pivots is positioned near an outer lateral edge section of the bracket 5 and of the reflector 1 and below the screen edge section 13 of the screen 4 at a lower level. This makes it possible to provide a smaller pivoting angle α of the screen 4 than if the pivoting axis were below the screen edge section 12 at the higher level. The screen 4 and the adjusting device 6 are mounted on a side of the bracket 5 facing away from the reflector 1, with the adjusting device 6 being attached to an area 7 of the bracket 5 below the long stretched-out screen 4 which serves to shield light beams emanating from the light source 2. Viewed in the direction in which the light exits, the entire length of the adjusting device 6 can be positioned inside the area 7, or, if sufficient room is available in the headlamp housing, it can extend out of the area 7. The adjusting device 6 has a first electromagnet 16 as well as a second electromagnet 18 (or a third electromagnet 23 in the FIG. 4 embodiment.

Figure 2:
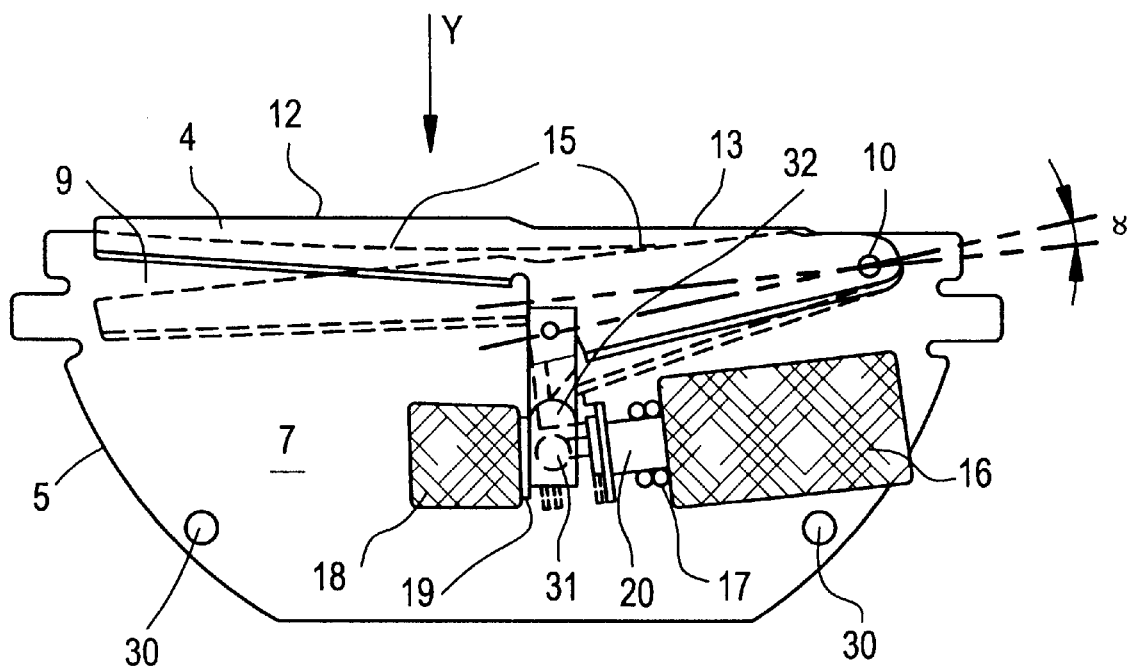
FIGS. 2, 4 and 6 are views from a direction X in FIG. 1, of variously structured screens and adjusting devices of different embodiments of this invention.
Figure 3:
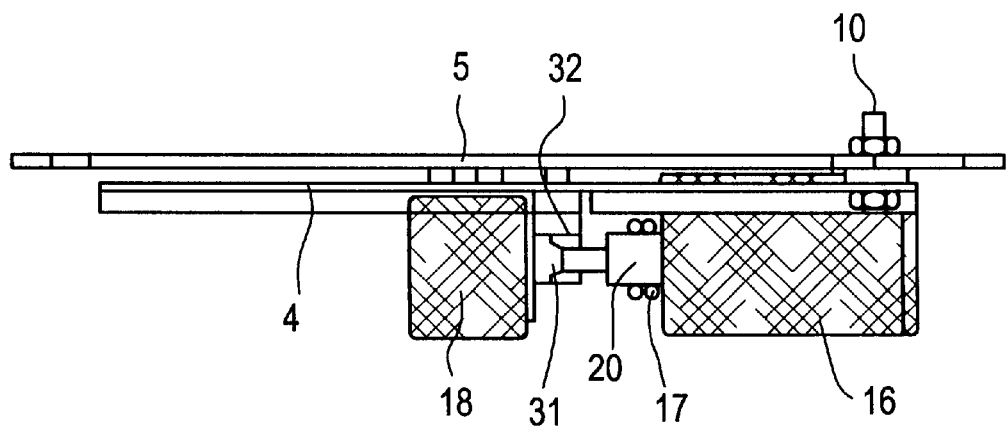
FIGS. 3 and 5 are respective, top views, from direction Y in FIGS. 2 and 4.

In FIGS. 2 and 3, a stroke magnet (solenoid) serves as the first electromagnet 16, a stroke element 20 of which, when the first electromagnet 16 is activated, pivots the screen 4, against a force of a holding device 17, from the low-beam into the high-beam position. A helical compression spring serves as the holding device 17, through which the end section of the stroke element 20 extends out of the housing of the first electromagnet 16, and which is positioned, prestressed, between a free end of the stroke element 20 and a housing of the first electromagnet 16. The stroke direction of the first electromagnet 16 is approximately in a direction of the length of the screen 4, and the first electromagnet 16 is positioned directly below the screen edge section 13 at the lower level. The stroke element 20 has a ball head 31 at its free end which engages in a guide piece 32 on the screen 4. The guide piece 32 is a projection protruding downwardly from the rest of the screen 4. When the screen 4 is pivoted, the ball head 31 of the stroke element 20 slides in the guide piece 32, which extends nearly vertically. When the screen 4 is switched from the high-beam into the low-beam configuration, current to the first electromagnet 16 is terminated. Then the holding device 17, formed by the compression spring, presses the stroke element 20 out of the housing of the first electromagnet 16, and the ball head 31 of the stroke element 20 presses the screen 4 into the low-beam light position. In the low-beam light configuration, the guide piece 32 is adjacent to the second electromagnet 18. When the low-beam light of the headlamp is switched on, the second electromagnet 18 is activated, and its force, in addition to the force of the holding device 17, holds the screen 4 in the low-beam light position. The screen 4 can also be pivoted from the high-beam into the low-beam light position through the combined forces of the holding device 17 and the second electromagnet 18. The second electromagnet 18 or a section of the bracket (not shown) can serve as a stop-motion device for the screen 4 in the low-beam light position. The first and second electromagnets 16 and 18 are attached to the bracket 5 via spacers 8.

Figure 4:
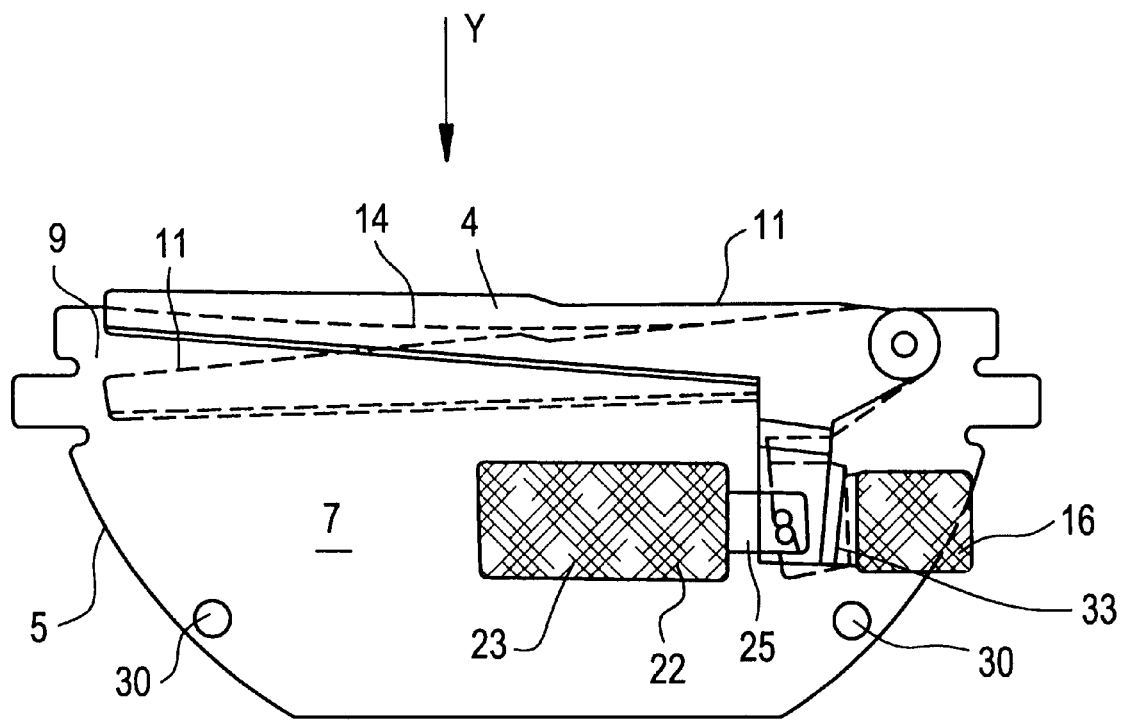
Figure 5:
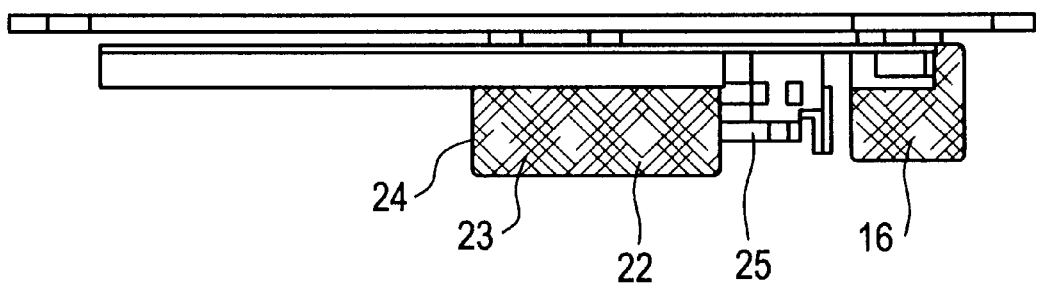

In FIGS. 4 and 5, a holding device 22 that pivots the screen 4 automatically from the high-beam into the low-beam light position and automatically holds the screen 4 in the low-beam light position is formed of permanent magnet 22. The permanent magnet 22 is integrated into a housing 24 of the third electromagnet 23, which is a stroke magnet, whose stroke element 25 is linked to the screen 4. The screen 4 is held in the low-beam light position by a force of the permanent magnet 22, which holds the stroke element 25 against a stop-motion device of the housing of the third electromagnet 23. A longitudinal axis of the stroke element 25 runs approximately in the direction of the length of the screen 4. When switching from low-beam to high-beam light, the magnetic force of the permanent magnet 22 is at least partly offset by activating the third electromagnet 23, and the first electromagnet 16, through its attracting power, pivots the screen 4 against a stop-motion device 33 formed by the first electromagnet 16. In the high-beam configuration of the screen 4, current to the third electromagnet 23 is terminated, since an attraction power of the permanent magnet 22 in the high-beam configuration of the screen 4 is significantly smaller than a retention force of the screen 4 in the low-beam light configuration.

Figure 6:
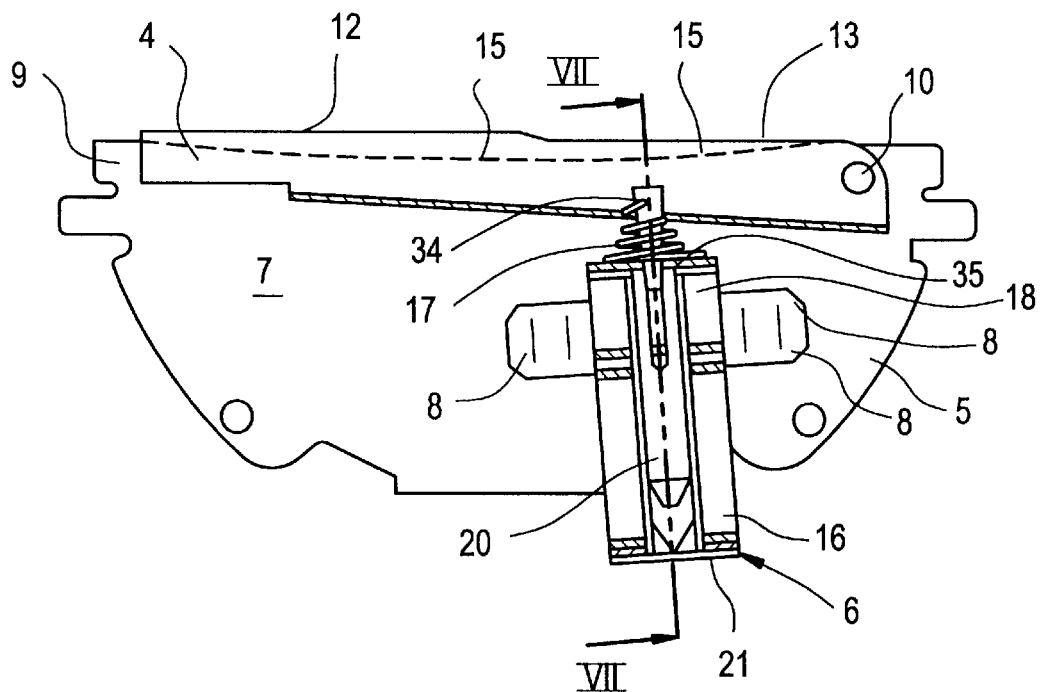
Figure 7:
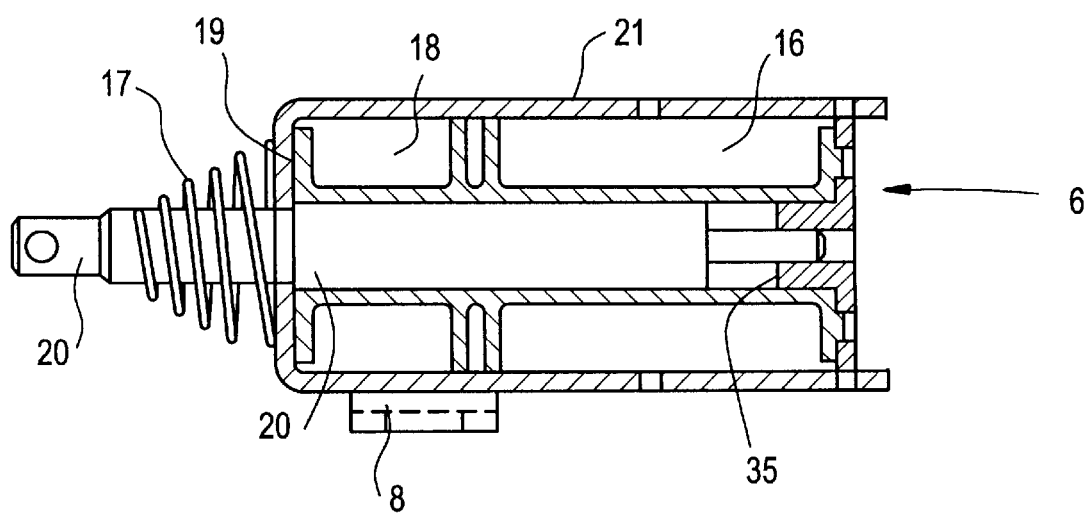
FIG. 7 is a cross-sectional view taken along line VII—VII in FIG. 6, through the adjusting device.

FIGS. 6 and 7 show an adjusting device 6 wherein first and second electromagnets 16 and 18 form a single structural unit 21. The first and second electromagnets 16 and 18 are arranged one behind the other, and have a common stroke element 20, an end section of which, extending from the structural unit 21, passes through a holding device 17 formed by a conical compression spring. A longitudinal axis of the stroke element 20 is tangent to a circular arc, the center point of which is the axis 10 of the screen 4. A joint 34 between a free end of the stroke element 20 and the screen 4 is placed near the circular arc. In the low-beam configuration of the screen 4, the stroke element 20 is held against a stop-motion device 19 and, in the high-beam configuration of the screen 4, it is held against a stop-motion device 35. The stop-motion devices 35 and 19 face each other and are formed by an inside of the structural unit 21. The structural unit 21 is fastened to the bracket 5 by clip-like spacers 8. The screen 4 is shown in a solid line in the low-beam configuration, and the bracket edge 15 is shown in a dotted line for producing a light/dark border in the high-beam configuration (compare this with FIGS. 2 and 3 where the screen 4 is also shown in solid and dashed lines in respective low and high-beam position). The structural unit 21 formed by the first and second electromagnets 16 and 18 can also be positioned on the bracket 5 so that the longitudinal axis of the stroke element 20 runs approximately in the direction of the length of the screen 4 or screen edge 11 of the screen 4. The stroke element 20 engages with a ball head in a vertical guide piece of the screen 4.

In a headlamp as in FIG. 8, the remote-controlled adjusting device 6 is positioned in a recess 36 of a plate-like-shaped bracket 5 that opens out toward the lens 3. The recess 36 is produced using a deep-drawing molding process. The adjusting device 6 is fastened at a bottom of the recess 36 by a riveted joint (not shown). A stroke element 39 of the adjusting device 6, along with the adjustable screen 4 and a bearing forming the axis 10, lie approximately in a plane that runs adjacent to a main plane of the plate-like bracket 5. That portion of the plate-like bracket 5 forming the recess 36 engages in a cutout of an outer edge area of the reflector 1. On a side of the recess facing away from the lens, a piece of electronic equipment 37 is attached below the reflector. The electronic equipment 37 is connected to the adjusting device 6 by means of solder-on pins 38. The electronic equipment 37 provides signal processing and wiring for the adjusting device.

For a heat sensitive adjusting device, it is advantageous for the device to be attached to the area below the screen on the side of the bracket facing away from the reflector. By having it this way, the area of the bracket positioned below the screen shields the adjusting device from light beams of the light source that would further heat the adjusting device.

For an adjusting device that is not heat sensitive, it is advantageous for the device to be attached to the area below the screen on the side of the bracket facing toward the reflector. In so doing, the adjusting device is shielded from view inside the headlamp by the area of the bracket below the screen, and no special exterior appearance measures are required.

The bracket is particularly stable if it extends at least to the edge of the optical system defined, or formed, by outer edges of the reflector, the screen and the lens, and covers the entire forward open area of the reflector located below the adjustable screen. In this manner, no stray light beams can pass the adjustable screen below the adjustable screen. The reflector and the bracket together form a distortion-resistant unit if the bracket is attached below the adjustable screen and, to both sides of the adjustable screen, to the front edge of the reflector.

For a heat sensitive adjusting device, it is advantageous for the device to be attached to the bracket via spacers, since the bracket can become extremely hot along its upper edge area that supports the screen.

The area of the bracket located below the adjustable screen can be quite large if the area is bordered toward the top by the adjustable screen which is structured as a single-armed lever, the length of which runs adjacent to the upper edge area of the bracket, capable of pivoting about an axis extending a light-exit direction. In this way, at least a greater part of an adjusting device can lie inside the area of the bracket.

In a vehicle headlamp in which an adjustable screen provides the dark/light limit for asymmetrical low-beam light with its edge and in which the remote-controlled adjusting device can be adjusted into positions that provide low-beam and high-beam light, with the two screen edge sections extending at different levels the higher of which, in the screen position for low-beam light, creates the section of the dark/light limit for an on-coming lane side, and the lower of which creates the section of the light/dark limit for the driving lane, it is further advantageous if the screen, which can pivot about an axis extending in the light-exit direction, is substantially spaced from a vertical center plane, and positioned below the screen edge section at the lower level. Thus the screen must be displaced by only a very small angle of deflection to provide high-beam and low-beam light. If the screen axis were placed below the screen edge section at the higher level, the angle of deflection of the screen would need to be significantly larger, and thus a displacement time of the screen would be greater, and the area of the bracket below the adjustable screen available for the adjusting device would be smaller. In this regard, it is also advantageous for the axis about which the screen pivots to run through the upper edge area of the plate-like bracket.

Symmetrical light distribution is provided for high-beam light by the bracket having a screen edge for high-beam light extending above the adjustable screen, in the screen position for high-beam light, with two sections inclined with respect to a vertical center plane of the reflector. Owing to the inclined sections of the upper edge area of the bracket, the axis about which the screen pivots can be placed higher than if the bracket edge of the bracket were horizontal.

In a remote-controlled adjusting device having considerable structural height in the direction of the optical axis of the headlamp, it is advantageous to have a recess in an area of the stationary bracket for receiving the remote-controlled adjusting device. The recess can be deep enough so that the adjustable screen, the stroke element and the bearing that forms the axis lie approximately in a plane that runs adjacent to a main plane of the bracket. By placing the adjusting device in the recess of the bracket and by placing the stroke element close to the main plane of the bracket, no additional moment of torsion is created that acts on the bracket.

In a particularly advantageous further enhancement of the invention, the recess of the bracket opens towards the lens, and a piece of electronic equipment located below the reflector is attached to the bracket outside of the recess. The electronic equipment is attached to the bracket at the recess where it has considerable stiffness, and given its position outside the reflector, it is not exposed to heat generated by the light source. The electronic equipment controls an electrical supply to the adjusting device.

The invention claimed is:

1. Vehicle headlamp having a saucer-shaped reflector (1) with two focuses, a light source (2) located at one focus of the reflector (1), a lens (3), a stationary plate-like bracket (5) located between the lens (3) and the reflector (1) with an adjustable screen (4) attached thereto that can be adjusted by means of a remote-controlled adjusting device (6) into at least positions for high-beam and low-beam light, wherein the remote-controlled adjusting device (6) is positioned at least partially within an optical system comprising the reflector (1), the screen (4) and the lens (3), and is attached below the screen (4) to an area (7) of the stationary bracket (5) that serves as a shielding element for light beams of the light source (2).

2. Vehicle headlamp as in claim 1, wherein the remote-controlled adjusting device (6) is attached to a side of the bracket (5) facing away from the reflector (1), in the area (7) below the screen (4).

3. Vehicle headlamp as in claim 1, wherein the remote-controlled adjusting device (6) is attached to a side of the bracket (5) facing toward the reflector (1), in the area (7) below the screen (4).

4. Vehicle headlamp as in claim 1, wherein the area (7) of the bracket (5), which serves as a shielding element and for fastening the remote-controlled adjusting device (6), extends at least as far as an edge of the optical system comprising the reflector (7), the screen (4), and the lens (3), and shields nearly an entire front opening section of the reflector (1) located below the adjustable screen (4).

5. Vehicle headlamp as in claim 4, wherein the bracket (5) is attached on both sides of the vertical center plane of the reflector (1) on a front edge of the reflector (1).

6. Vehicle headlamp as in claim 1, wherein the remote-controlled adjusting device (6) is attached to the area (7) of the bracket (5) via spacers (8).

7. Vehicle headlamp as in claim 1, wherein the area (7), which serves as a shielding element and for fastening the remote-controlled adjusting device (6), is bordered toward a top by the adjustable screen (4) which is structured as a single-armed lever, a length of which runs adjacent to an upper edge area (9) of the bracket (5) and which can pivot about an axis (1) extending in a direction in which light exits the headlamp.

8. Vehicle headlamp as in claim 1, wherein said adjustable screen (4) generates a dark/light limit of asymmetrical low-beam light with a screen edge (11) thereof and can be adjusted by use of the remote-controlled adjusting device (6) into positions that provide low-beam and high-beam light, said adjustable screen having high and low screen edge sections (12) and (13) being at different levels, with the high screen edge section (12), in a low beam position of the screen (4), creating a dark/light limit for an on-coming lane side and the low screen edge section (13) creating a dark/light limit for a traveling lane side, wherein the adjustable screen (4) can pivot about an axis (10) extending in a light-exit direction which is spaced from a vertical center plane and positioned below the low screen edge section (13).

9. Vehicle headlamp as in claim 7, wherein the axis (10) runs through an upper edge area (9) of the plate-like bracket (5).

10. Vehicle headlamp as in claim 1, wherein the bracket (5) has a bracket edge (14) for forming a dark/light limit during high-beam light, during said bracket edge being positioned above the adjustable screen (4) in the position of the adjustable screen (4) for high-beam light.

11. Vehicle headlamp as in claim 10, wherein the bracket edge (14) has two sections (15) extending at an inclination with respect to the vertical center plane of the reflector (1).

12. Vehicle headlamp as in claim 1, wherein a recess (36) is formed in the area (7) of the stationary bracket (5) for receiving the remote-controlled adjusting device (6).

13. Vehicle headlamp as in claim 12, wherein the adjustable screen (4), a stroke element (39) of the adjusting device, and a bearing between the stroke element and adjusting device for forming an axis (10), lie approximately in a plane that runs adjacent to a main plane of the bracket (5).

14. Vehicle headlamp as in claim 12, wherein the recess (36) of the bracket (5) opens toward the lens (3) and the bracket, at the recess, has a piece of electronic equipment (37) mounted thereon, located below the reflector (1).

* * * * *